March 12, 1957 W. B. DEAN 2,784,983
BOX SECTIONAL SILL PARTICULARLY FOR AUTOMOBILE CHASSIS FRAMES
Filed July 6, 1953 2 Sheets-Sheet 2
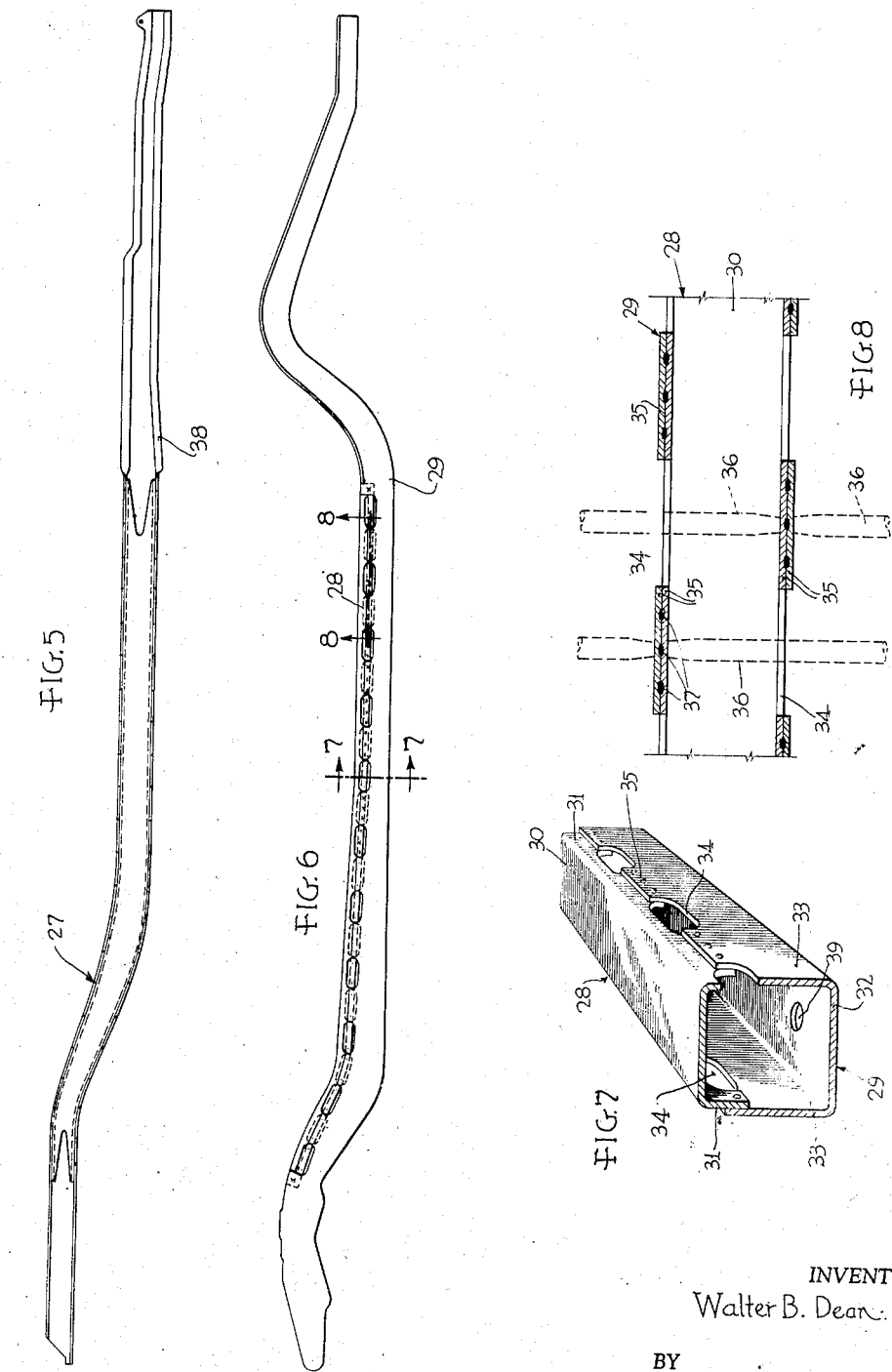
INVENTOR
Walter B. Dean
BY
Maurice A. Creus
ATTORNEY

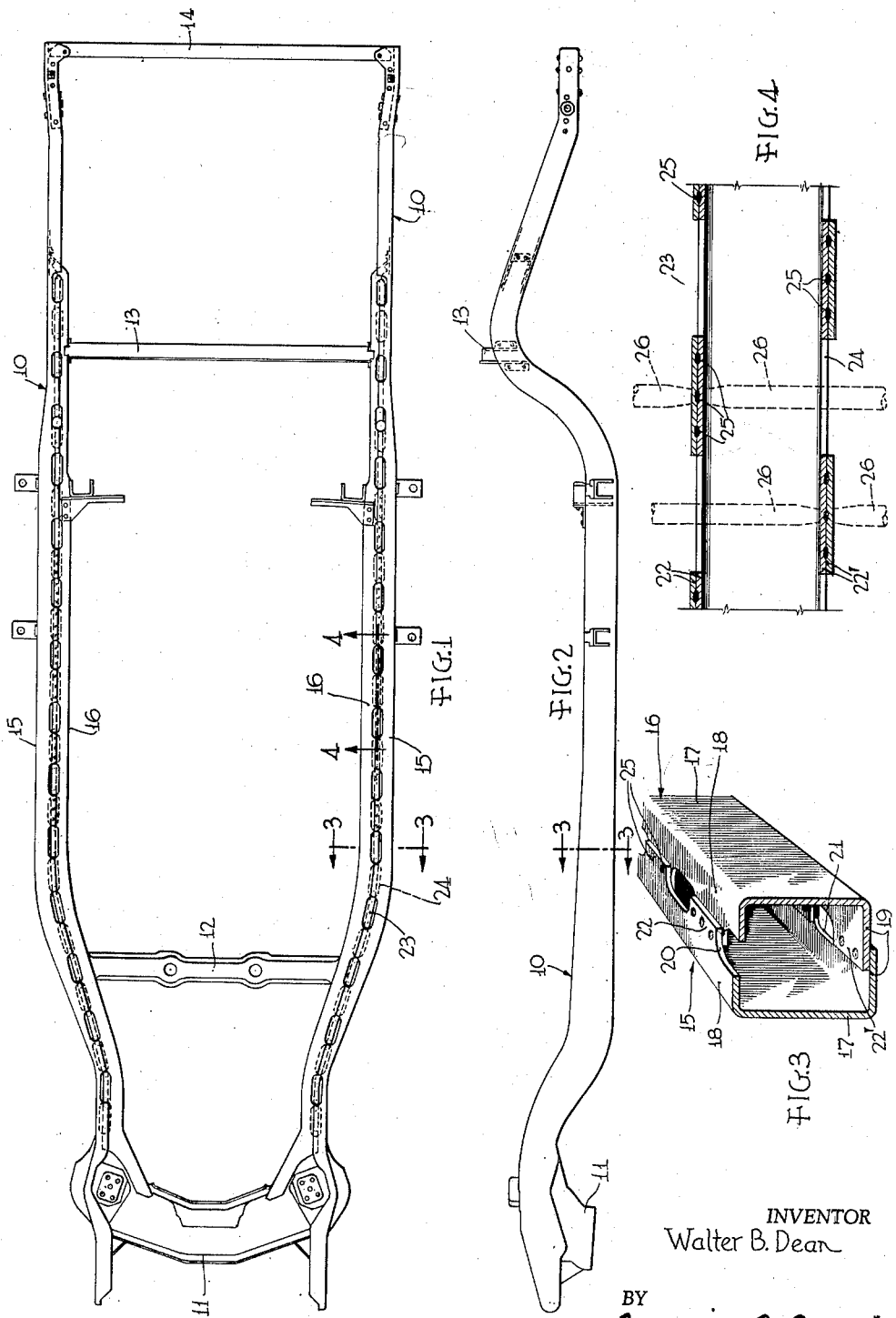

United States Patent Office 2,784,983
Patented Mar. 12, 1957

2,784,983

BOX SECTIONAL SILL PARTICULARLY FOR AUTOMOBILE CHASSIS FRAMES

Walter B. Dean, Narberth, Pa., assignor to The Budd Company, Philadelphia, Pa., a corporation of Pennsylvania Application July 6, 1953, Serial No. 366,355

5 Claims. (Cl. 280—106)

The invention relates to box sectional sills, particularly chassis sills for automobiles, composed of two or more sheet metal profiles overlappingly connected with each other by spot welding or comparable connecting means such as rivets.

Among the objects of the invention is the creation of a closed box sectional sill or beam of the indicated type which avoids the now widely used but in certain respects undesirable connection of its parts by arc welding, which has desired strength, torsional and rigidity characteristics, which lends itself to speedy and convenient manufacture by comparatively simple tools, and which has a favorable weight to strength ratio.

An important feature of the invention is the arrangement of clear, free or unobstructed openings or passages in certain walls of the sill directly opposite overlapping portions of another wall to be connected by spot welding, so that equipment with straight, linearly moving spot-welding electrodes or other connecting tools can be employed.

A further feature of the invention resides in the provision of overlapping portions to be connected with each other in opposite walls of the sill and in providing the open entry holes for the electrodes or the like in the same walls while offsetting the holes in the opposite walls so that each hole will register with an overlapped portion to be welded but will not register with a hole in the opposite wall.

The above and other objects, advantages and features of the invention as well as the details thereof will be more fully and easily understood from the embodiments described in the following and illustrated in the attached drawing.

In the drawing:

Figures 1 and 2 are plan view and side elevation, respectively, of a chassis frame with side sills representing one form of the invention;

Figure 3 is a sectional, fragmentary perspective on a larger scale, the section being taken along lines 3—3 of Figures 1 and 2;

Figure 4 is a fragmentary section on a larger scale along line 4—4 of Figure 1, showing in dotted lines diagrammatically the application of spot welding electrodes;

Figures 5 and 6 are plan view and side elevation, respectively, of a chassis frame side sill representing another form of the invention; and Figures 7 and 8 correspond to Figures 3 and 4, the sections being taken along lines 7 and 8, respectively, of Figure 6.

The chassis frame illustrated in Figures 1 and 2 has a customary general layout. It comprises a pair of side sills 10, a forward motor and front wheel supporting transverse beam 11, a rear motor supporting transverse beam 12, and further transverse beams 13 and 14 at and near the rear end of the frame.

Each sill 10 consists of an outer channel section 15 and an inner channel section 16, the two channel sections facing each other. The channel sections have vertical bottom walls 17, upper legs 18 and lower legs 19. The two legs 18 and 19 respectively form the top wall and the bottom wall of the box sectional sill 16. Inner sill member 16 ends short of the rear end of outer member 15 on account of the smaller stresses to be sustained at the rear end of the frame.

Legs 18 and 19 are scalloped at 20 and 21 respectively leaving between the scallops projecting marginal portions 22 and 22′ respectively. Members 15 and 16 overlap each other by their marginal projecting portions 22 and 22′ and leave between these portions elongated holes or openings 23 and 24 respectively formed by the scallops 20 and 21. This is best shown in Figure 3.

The openings 23 in top wall 18 and the openings 24 in bottom wall 19 are offset relative to each other in longitudinal direction so that each opening is vertically opposite an overlapping region 22 or 22′, respectively. The offset arrangement of the holes 23, 24 and of the projecting portions 22, 22′ between them permits connection of the overlapping portions by spot welds 25, riveting or the like (not shown) with the help of straight, linearly movable connecting tools, such as spot welding electrodes 26 diagrammatically illustrated by dotted lines in Figure 4.

This new formation and arrangement lends itself to very convenient and speedy assembly of each side sill, for instance in an automatic welding machine in which each opening is entered simultaneously by sets of electrodes corresponding to the number of welds 25 to be formed opposite each of such hole. Instead of providing a separate electrode for each weld, a single electrode might enter each hole and the plurality of welds opposite such hole may be effected by relatively moving electrodes and sill.

The side sill 27 shown in Figures 5 to 8 comprises an upper channel section 28 and a lower channel section 29. The upper channel section is downwardly facing, it has a web 30, forming the top wall of the sill, and downwardly extending legs 31. Section 29 is upwardly facing, it has a web, forming the bottom wall 32 of the sill, and upwardly extending legs 33. Legs 31 and 33 form together the side walls of the box sectional sill. The margins of legs 31, 33 are scalloped to form openings 34 between their vertically projecting portions 35. The portions 35 of the sections 28, 29 overlap each other and, as in the first embodiment, the openings 34 and projecting portions 35 on opposite sides are staggered relative to each other so that the overlapping portions may be connected conveniently with the help of electrodes 36 by spot welds 37.

Upper channel section 28 is restricted to the mid region of the frame where the largest stresses are to be sustained. Lower sill member 29 is provided with outwardly directed flanges 38 in the region rearwardly projecting beyond member 28, for reinforcing purposes and for convenient attachment of adjoining members such as cross beams (not shown).

While in the first embodiment water or dirt entering the interior of the sills will eventually fall out through the bottom holes 24, the second embodiment is provided for the same purpose with drain holes 39 in appropriate locations, one of which is visible in Figure 7.

The invention is not restricted to the illustrated embodiments but is susceptible to modification and adaptations. Particularly, for instance: the holes may be formed at a distance from the margins of one or both members; the number of welds to be made opposite each opening is optional; the form and size or length of the opening depends upon the number of welds or the like to be made in the opposite wall; the holes and overlap connections may be arranged at other locations, advantageously at or close to the neutral plane of the sill where the holes have the least weakening effect; and the sill may be composed of more than two profiles and the profiles may be other than channel sections or channel sections with legs of equal width.

What is claimed is:

1. Box-sectional sill, particularly chassis sill for automobiles, having at least two pairs of walls, the walls of each pair being arranged on opposite sides of the box section, said sill being comprised of a least two sheet metal profiles having mutually overlapping marginal portions on at least two walls of said box sections, open holes in walls opposite each of said last named walls of the box section and arranged in at least two rows and perpendicularly opposite said overlapping portions, said holes of one row being offset relative to the holes of the other row, said relative arrangement of said overlapping portions and of said holes permitting the use of straight, linearly movable connecting tools entering said holes and engaging said overlapping portions inside said sill.

2. Box-sectional sill having several pairs of walls defining the box section, the walls of each pair being arranged opposite each other, said sill being comprised of at least two sheet metal profiles having mutually overlapping marginal portions on at least two walls of said box section, clear holes in each respective wall opposite said last named two walls of the box section arranged perpendicularly opposite said overlapping portions, said holes being offset relative to each other, said holes being elongated in the longitudinal direction of the sill permitting at least two different locations of connecting tools in each hole for making a corresponding number of connections, such as spot welds between the overlapping portions of the wall opposite such hole.

3. Box-sectional sill comprised of at least two sheet metal profiles having mutually overlapping marginal portions on at least two walls of said box section, said marginal portions being scalloped at intervals providing free openings arranged perpendicularly opposite overlapping portions of an opposite wall, said openings in different walls being offset relative to each other.

4. Sill, particularly chassis sill for automobiles, comprising two channel sections facing each other and overlapping each other with marginal portions of their legs, the marginal portions of said legs being provided at intervals with openings for the entry of connecting tools such as spot welding electrodes, the openings in opposite walls of the sill being unobstructed and longitudinally offset relative to each other and registering with overlapping portions of the respective opposite wall.

5. Sill, particularly chassis sill for automobiles, comprising two channel sections facing each other and overlapping each other with marginal portions of their legs, the marginal portions of said legs being scalloped at intervals providing open passages for the entry of connecting tools such as spot welding electrodes, the open passages in opposite walls of the sill being longitudinally offset relative to each other and registering with overlapping portions of the respective opposite wall.

References Cited in the file of this patent
UNITED STATES PATENTS

| | | |
|---|---|---|
| 2,062,287 | Block | Dec. 1, 1936 |
| 2,297,123 | Almdale | Sept. 29, 1942 |
| 2,311,880 | Sherman | Feb. 23, 1943 |
| 2,611,627 | Reynolds | Sept. 23, 1952 |